United States Patent [19]

Cook et al.

[11] 4,001,578

[45] Jan. 4, 1977

[54] OPTICAL COMMUNICATION SYSTEM WITH BIPOLAR INPUT SIGNAL

[75] Inventors: John Stone Cook, Rumson; Stewart David Personick, Middletown, both of N.J.

[73] Assignee: Bell Telephone Laboratories, Incorporated, Murray Hill, N.J.

[22] Filed: Aug. 1, 1975

[21] Appl. No.: 601,049

[52] U.S. Cl. .................................. 250/199; 178/67; 178/68; 325/38 A; 340/347 DD
[51] Int. Cl.² ...................................... H04B 9/00
[58] Field of Search ............... 250/199; 178/67, 68; 340/347 DD; 325/38 A

[56] References Cited

UNITED STATES PATENTS

| | | | |
|---|---|---|---|
| 3,569,955 | 3/1971 | Maniere | 340/347 DD |
| 3,809,908 | 5/1974 | Clanton | 250/199 X |
| 3,815,122 | 6/1974 | Schwartz | 340/347 DD |

OTHER PUBLICATIONS

Takasaki et al., "Line Coding Plans for Fiber Optic Communication Systems" Conf. Record vol. II, International Conf. on Comm. S.F. Cal. pp. 32-20 to pp. 32-24; June 16, 1975 to June 18, 1975.

Takasaki et al., "Line Coding Plan for Fiber Optic Communication Systems" Proceedings of IEEE, July 1975, pp. 1081-1082.

*Primary Examiner*—Benedict V. Safourek
*Assistant Examiner*—Michael A. Masinick
*Attorney, Agent, or Firm*—Daniel D. Dubosky

[57] ABSTRACT

A bipolar electrical signal of the type transmitted in the T1 digital transmission system is converted into an optical binary signal having pulses and spaces by translating each positive digital "1" in the bipolar signal into two digital pulses, each negative digital 1 in the bipolar signal into two spaces, and the digital 0 in the binary signal into an optical pulse followed by a space. The nonpermitted code of a space followed by an optical pulse is utilized at the receiving location for instantaneous framing. As a result of this particular code conversion, the balanced property of the bipolar input signal is maintained in the optical signal thereby preventing an offset bias from developing at the receiving location in the photodetector. In addition, the bipolar information is maintained in transmission, thus making the optical system "transparent" to bipolar signals.

11 Claims, 4 Drawing Figures

OPTICAL COMMUNICATION SYSTEM WITH BIPOLAR INPUT SIGNAL

BACKGROUND OF THE INVENTION

This invention relates to optical communication systems and, more particularly, to apparatus for converting a bipolar electrical signal into an optical signal capable of being transmitted over an optical transmission system.

Large numbers of messages are now transmitted over the telephone plant by means of T1 and T2 Carrier Systems. In these systems, speech signals are coverted into bipolar electrical signals which are essentially binary in nature but the adjacent logic "1s" are caused to alternate in polarity. This alteration in polarity was deemed necessary in order to insure that a sufficient number of transitions would be available in the signal in order to permit the repeaters to derive timing information and to provide dc balance to preclude baseline wander in the ac coupled receiver. In addition, violations in the alternating polarity, known to those in the art as "bipolar violations," are inserted in order to stress receivers by introducing known amounts of baseline wander. The medium used for connecting the terminal stations and repeaters is wire pair cable.

A large number of wire pair cables utilized to transmit both T1 and T2 carrier signals have already been installed in the major cities. These cables are physically positioned within ducts beneath the surface of the streets of the cities. Many of the ducts have already been loaded with wire pair cables to their full capacity. Expansion of the telephone plant in these areas, if that expansion is to take place with similar T Carrier Systems, will require the installation of additional ducts. It would be advantageous if the existing wire pair cables in these ducts could be replaced by optical fibers inasmuch as each fiber is smaller than a wire and, in addition, may allow larger bandwidths to be transmitted, thus increasing the total number of conversations which may be sent within any given duct.

In the period of transition when wire pair cables are being replaced by optical fibers, many electrical bipolar signals of the type generated in the T1 Digital Transmission System will have to be converted into optical signals in order to permit them to be transmitted over optical fibers. Inasmuch as there is no straightforward equivalent of two polarities in the optical signal, some sort of conversion is necessary. It would also be advantageous if the resulting optical signal were simply of the binary type as opposed to a multilevel optical signal, in order to simplify the repeater units which will be necessary in the optical transmission system. Finally, it is desirable to maintain the polarity information present in the bipolar signal of the T Carrier System inasmuch as polarity transitions and bipolar violations will continue to provide information to T carrier type equipment operating at the receiving end of the optical transmission system.

SUMMARY OF THE INVENTION

The above-mentioned advantages, and more, are achieved in the present invention wherein each pulse present in the bipolar signal is converted into two binary digits, which then are utilized to modulate the optical signal from an optical signal source. Each positive pulse of the bipolar signal is converted into two equal binary digits of a first logic state and each negative pulse in the bipolar signal is converted into two equal binary digits of the opposite logic state. Each digital 0 or zero-voltage level in the bipolar signal is converted into two binary digits of opposite logic states. As a result of these conversions, the original polarity of each pulse in the bipolar signal can be recovered at the receiving end of the optical transmission system and the balance which existed in the input bipolar signal causes the photodetector to be presented with an optical signal having a dc bias level midway between the two logic states. One feature of this conversion is that the two opposite binary digits that are not utilized to determine when there have been errors in the transmission process or errors in timing. Detection of this particular pair of opposite-valued binary digits can be utilized to cause a shift in the binary pairing taking place within the decoding apparatus. It is an additional feature of the present invention that this shift in the binary pairing can take place without any loss in information at the receiving decoder.

BRIEF DESCRIPTION OF THE DRAWING

The present invention will be more readily understood after reading the following detailed description with the accompanying drawing, in which.

DETAILED DESCRIPTION

Figure 1:
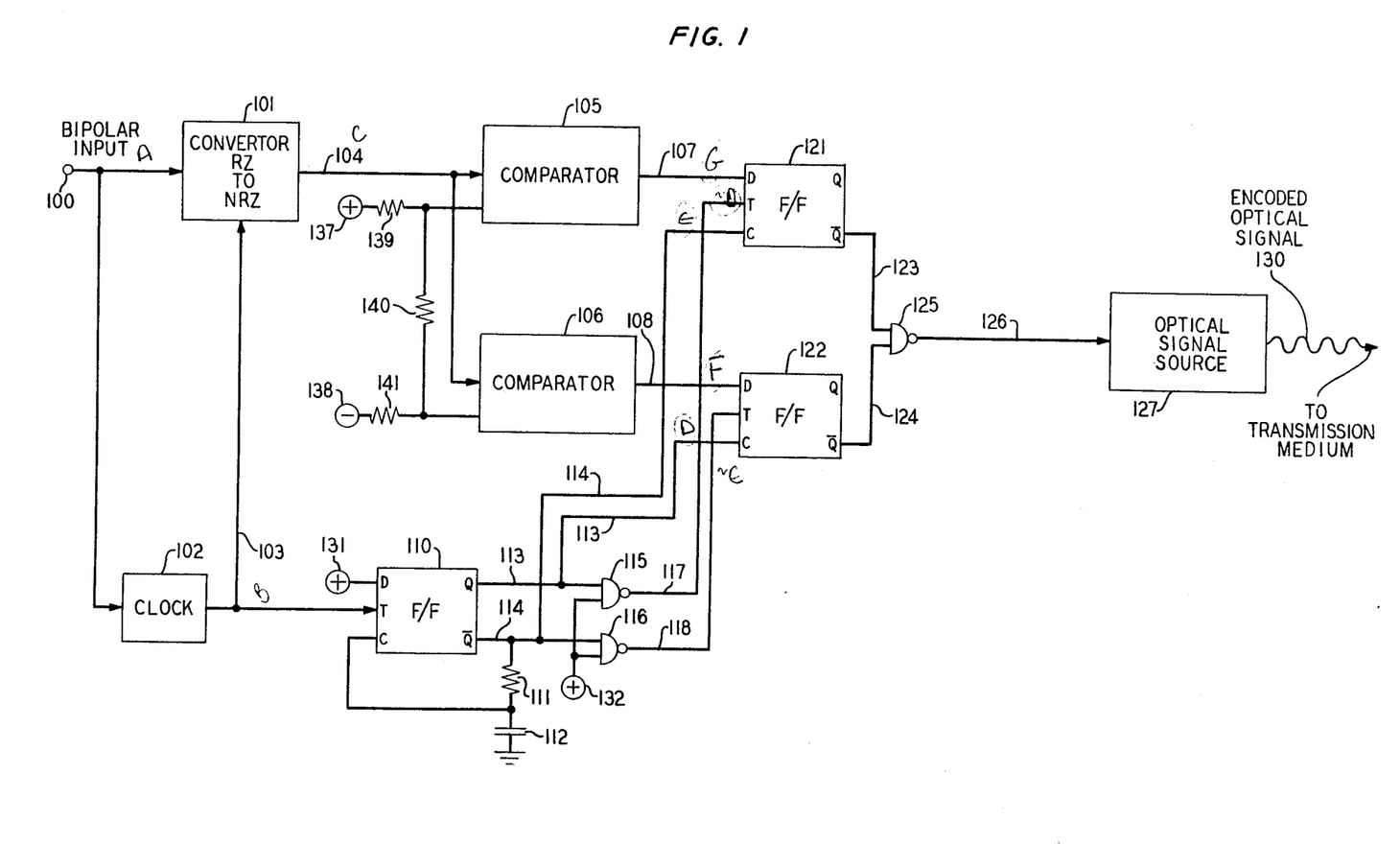
FIG. 1 is a schematic block diagram of a transmitting apparatus including an encoder constructed in accordance with the present invention.

A bipolar electrical signal of the type present in the T1 Digital Transmission System is coupled to input terminal 100 in FIG. 1. This bipolar signal is coupled both to the input of a converter apparatus 101 and to the input of a clock circuit 102. A voltage waveform of the type which would be present in this bipolar electrical signal is shown as waveform A in FIG. 3. Clock circuit 102, in a manner well known to those skilled in the art, responds to each transition present in the bipolar electrical signal in order to produce a clock waveform of the type shown as waveform B in FIG. 3. As indicated in waveform B, clock circuit 102 produces positive-going pulses at the bit rate present in the bipolar signal. The transitions present in the bipolar signal are simply utilized to synchronize the positive-going transition in each of the clock pulses.

Figure 3:
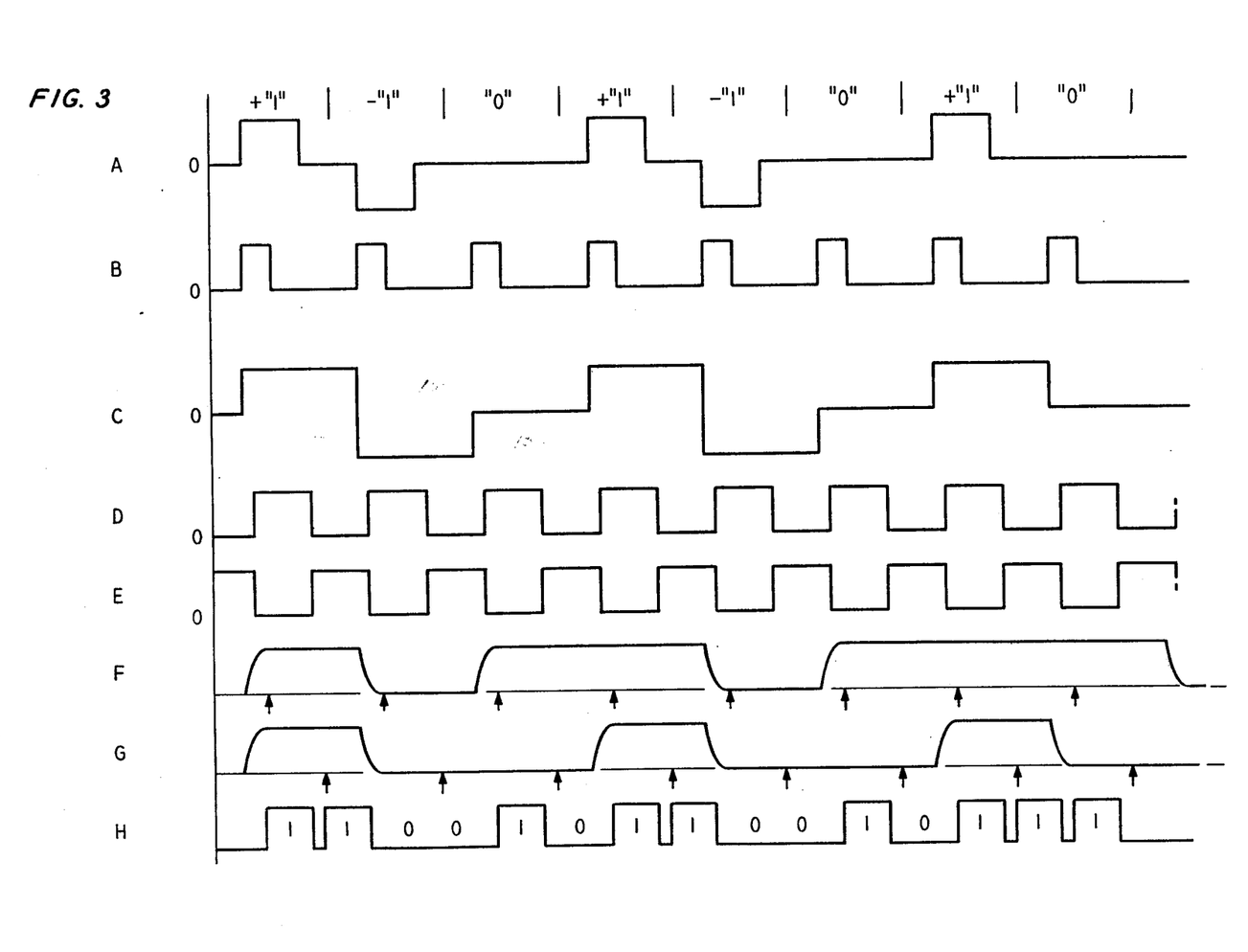
FIGS. 3 and 4 provide waveforms which are useful in describing the operation of the transmitting and receiving apparatus, respectively.

This clock waveform produced on line 103 by clock circuit 102 is coupled to the timing input of converter circuit 101. As indicated in FIG. 1, converter circuit 101 is a circuit which converts the return-to-zero waveform present at input terminal 100 into a non-return-to-zero pulse waveform. The resulting waveform on line 104 at the output of converter circuit 101 contains all of the polarity transitions present in the input bipolar waveform but the pulses are not caused to return to zero during each of the timing intervals as they are in the input bipolar waveform. For a bipolar digitial return-to-zero waveform of the type shown as waveform A in FIG. 3, converter circuit 101 develops the voltage waveform shown as waveform C in FIG. 3. As indicated in FIG. 3, each clock pulse on line 103 causes converter circuit 101 to sample the polarity and magnitude of the signal present at input terminal 100 and, in response to this clock pulse, causes converter circuit 101 to develop a voltage having an equivalent polarity and magnitude at the output of converter circuit 101 for an entire bit interval.

The bipolar nonreturn-to-zero signal present on line 104 is coupled to one input of a comparator circuit 105 and to one input of a comparator circuit 106. Comparator circuits 105 and 106 are identical in construction and operation. Each comparator circuit causes a positive voltage to be developed at its output when the voltage present at its first input exceeds the voltage present at its second input. Each comparator circuit develops a zero voltage at its output when the reverse situation is true, that is, when the voltage present at its first input is lower in magnitude than the voltage present at its second input. A biasing circuit including a positive potential source 137, a negative potential source 138 and series-connected resistors 139, 140 and 141 provide potentials which are connected to the second input of both comparator circuit 105 and comparator circuit 106. The second input of comparator circuit 105 is connected to the junction of resistors 139 and 140, whereas the second input of comparator circuit 106 is connected to the junction of resistors 140 and 141. As a result, the second input of comparator circuit 105 is biased to a positive potential equal in magnitude to approximately one-half of the potential present on line 104 during the positive pulses in the bipolar signal. The second input of comparator circuit 106 is biased to a negative potential equal in magnitude to approximately one-half of the potential present on line 104 during a negative pulse in the bipolar signal.

As a result of this biasing, comparator circuit 105 produces a positive potential at its output only during the intervals when a positive pulse is present in the bipolar signal on line 104, whereas comparator circit 106 produces a positive potential at its output both when the positive potential is present in the bipolar signal and when a digital zero is present in the bipolar signal of line 104. For a bipolar signal of the type shown as waveform C in FIG. 3, comparator circuits 105 and 106 produce output voltages of the type shown as waveforms G and F, respectively, in FIG. 3. As shown in FIG. 3, waveform F presents a positive potential during the intervals when a positive digital 1 and a digital 0 are present in waveform C of FIG. 3. Waveform G, on the otherhand, presents a positive potential only during the intervals when a positive digital 1 is present in waveform C.

The clock signal present on line 103 is also connected to the toggle input of a D-type flip-flop 110. The Q̄ output of flip-flop 110 is connected to an integrating circuit consisting of a resistor 111 and a capacitor 112. The voltage present across capacitor 112 is connected to the clear input of flip-flop 110. Each negative-to-positive-going transition present in the clock waveform on line 103 causes flip-flop 110 to switch to its ON state during which a digital 1 is provided at the Q output of flip-flop 110 and a digital 0 is provided at the Q̄ output of flip-flop 110. During the preceding interval when the Q̄ output of flip-flop 110 was at a digital 1, the capacitor 112 was caused to charge to a positive potential. When flip-flop 110 is switched its ON state by a positive-going transition in the clock waveform, capacitor 112 begins to discharge through resistor 111 to the zero potential provided at the Q̄ output during the ON state. Resistor 111 and capacitor 112 are chosen so as to discharge to the clearing potential in an interval approximately equal to one-half of the clock pulse interval. As a result, a voltage waveform is developed at both the Q and Q̄ outputs of flip-flop 110 whose frequency is equal to the clocking frequency but whose duty cycle is equal to approximately 50 percent. The voltage waveform developed on line 113 at the Q output of flip-flop 110 is illustrated as waveform D in FIG. 3, whereas the voltage waveform developed on line 114 at the Q̄ output of flip-flop 110 is illustrated as waveform E in FIG. 3.

Line 113 is connected to one input of a NAND gate 115, a second input of which is connected to a positive potential source. As a result, NAND gate 115 provides at its output on line 117 a timing waveform whose transitions are slightly delayed from the waveform present on line 113 and whose polarities are inverted from the polarities provided on line 113. Similarly, line 114 is connected to one input of a NAND gate 116, a second input of which is connected to a positive potential source. Hence, NAND gate 116 provides on line 118 a timing waveform whose transitions are slightly delayed from those present on line 114 and whose polarities are inverted from those present in the timing waveform of line 114.

The delayed timing waveform present on line 117 is connected to the timing input of a D-type flip-flop 121. Line 107, containing the output potentials developed by comparator circuit 105, is connected to the sampling or D input of flip-flop 121. Each positive-going transition present on line 117 causes flip-flop 121 to sample the potential present at the D input of flip-flop 121 and when this potential is positive it causes flip-flop 121 to change to its ON state. As indicated hereinabove, a positive-going transition is present on line 117 a short predetermined interval after a negative transition is present on line 113. In terms of the waveforms shown in FIG. 3, each negative-going transition in waveform D causes a sampling to occur in waveform G at the instants indicated by the arrows in the abscissa of waveform G.

Line 118, containing the delayed timing information present on line 114, is connected to the timing input of a D-type flip-flop 122. The sampling or D input of this flip-flop 122 is connected by line 108 to the output of comparator circit 106. In terms of the waveform shown in FIG. 3, each negative-going transition present in waveform E after a short predetermined delay interval provided by NAND gate 116 causes D-type flip-flop 122 to sample the potentials present in waveforms F at the instants indicated by the arrows in the abscissa of waveform F.

The clear input of flip-flop 121 is connected by way of line 114 to the Q̄ output of flip-flop 110 and the clear input of flip-flop 122 is connected by way of line 113 to the Q output of flip-flop 110. Flip-flops 121 and 122 are each cleared when a sufficiently low potential is provided to their respective clear input. Hence, each of these flip-flops will clear and transfer to their OFF states when a positive-to-negative transition is provided at the clearing input. The positive-to-negative transition present on line 113 which clears flip-flop 122, after a short interval determined by the delay in NAND gate 115, appears as a negative-to-positive transition on line 117, thereby causing the triggering of the timing input of flip-flop 121. Similarly, the positive-to-negative transition which clears flip-flop 121, after a short interval determined by the delay in NAND gate 116, appears as a negative-to-positive transition at the timing input of flip-flop 122. As a result, flip-flop 122 is cleared a short predetermined interval before flip-flop 121 is triggered and, similarly, flip-flop 121 is cleared a short predetermined interval befor flip-flop 122 is triggered.

The $\bar{Q}$ output of flip-flop 121 is connected by way of line 123 to one input of NAND gate 125, a second input of which is connected by way of line 124 to the $\bar{Q}$ output of flip-flop 122. Accordingly, NAND gate 125 provides at its output on line 126 a combined signal equivalent to the logic states provided at the Q outputs of both flip-flop 121 and flip-flop 122. This signal on line 126 is equivalent to the logic states at the Q outputs rather than the logic states at the $\bar{Q}$ outputs since NAND gate 125 essentially provides a polarity inversion to the signals present at its input inasmuch as either one of the flip-flops 121 or 122 is cleared during any interval when the other flip-flop may be triggered to an ON state.

For the outputs of comparator circuits 105 and 106 illustrated by waveforms G and F, respectively, in FIG. 3, NAND gate 125 provides the digital outputs illustrated in waveform H of FIG. 3. As indicated in waveform H, each positive digital 1 present at input 100 is translated into two digital 1s, each negative digital 1 present in the bipolar waveform at input 100 is translated into two digital 0s, and each digital 0 present at input 100 is translated into a digital 10. As is further indicated in waveform H of FIG. 3, the delays present in NAND gates 115 and 116 advantageously cause a gap to occur between adjacent digital 1s in waveform H. As a result, additional transitions will be available for timing purposes in the receiving apparatus and decoder to be discussed hereinbelow.

The digital signal on line 126 containing the information derived by encoding the input bipolar signal is connected to the control input of an optical signal source 127. This optical signal source can be a Burrus-type light emitting diode or any one of the several other optical signal sources known to those skilled in the art as devices which can be direct modulated. See, for example, the optical devices described on pages 1731 through 1733 of the article entitled "Research Toward Optical-Fiber Transmission Systems, Part I: The Transmission Medium, Steward E. Miller, Enrique A. J. Marcatili, and Tingye Li, Part II: Devices and Systems Considerations, Steward E. Miller, Tyngye Li, and Enrique A. J. Marcatili," *Proceedings of the IEEE*, Vol. 61, No. 12, December 1973. Alternatively, an optical signal source can be utilized to provide the input signal to an intensity modulator which in turn can be activated at its control input by the digital signal on line 126. External optical modulators of this type are described on pages 1733 through 1735 of Part II of the above-identified article by S. E. Miller et al. The resulting encoded optical signal is then coupled to a transmission medium such as an optical fiber.

Figure 2:
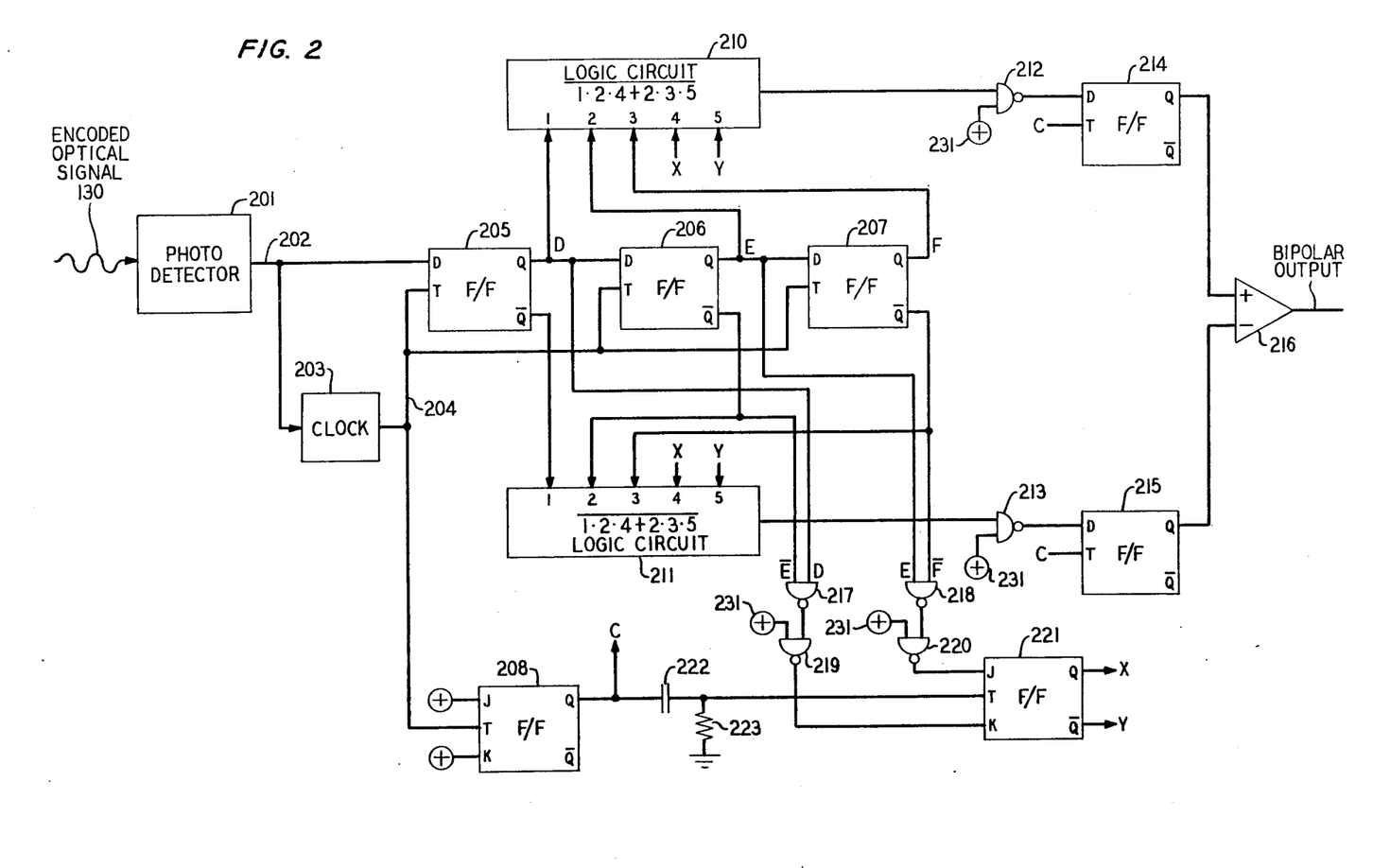
FIG. 2 is a schematic block diagram of a receiving apparatus including a decoder constructed in accordance with the present invention.

After transmission over the optical fiber, the encoded optical signal is caused to impinge on a photodetector 201 in FIG. 2. In response to the presence of an optical signal, photodetector 201 causes a positive potential to be developed at its output on line 202. For the digital signal illustrated as waveform H in FIG. 3, after transmission over the optical fiber photodetector 201 develops a voltage waveform of the type illustrated as waveform A in FIG. 4. As indicated in waveform A of FIG. 4, the transitions present during adjacent digital 1s are not as large as the transition between opposite digital states but, nevertheless, they are present and available for timing purposes.

Figure 4:
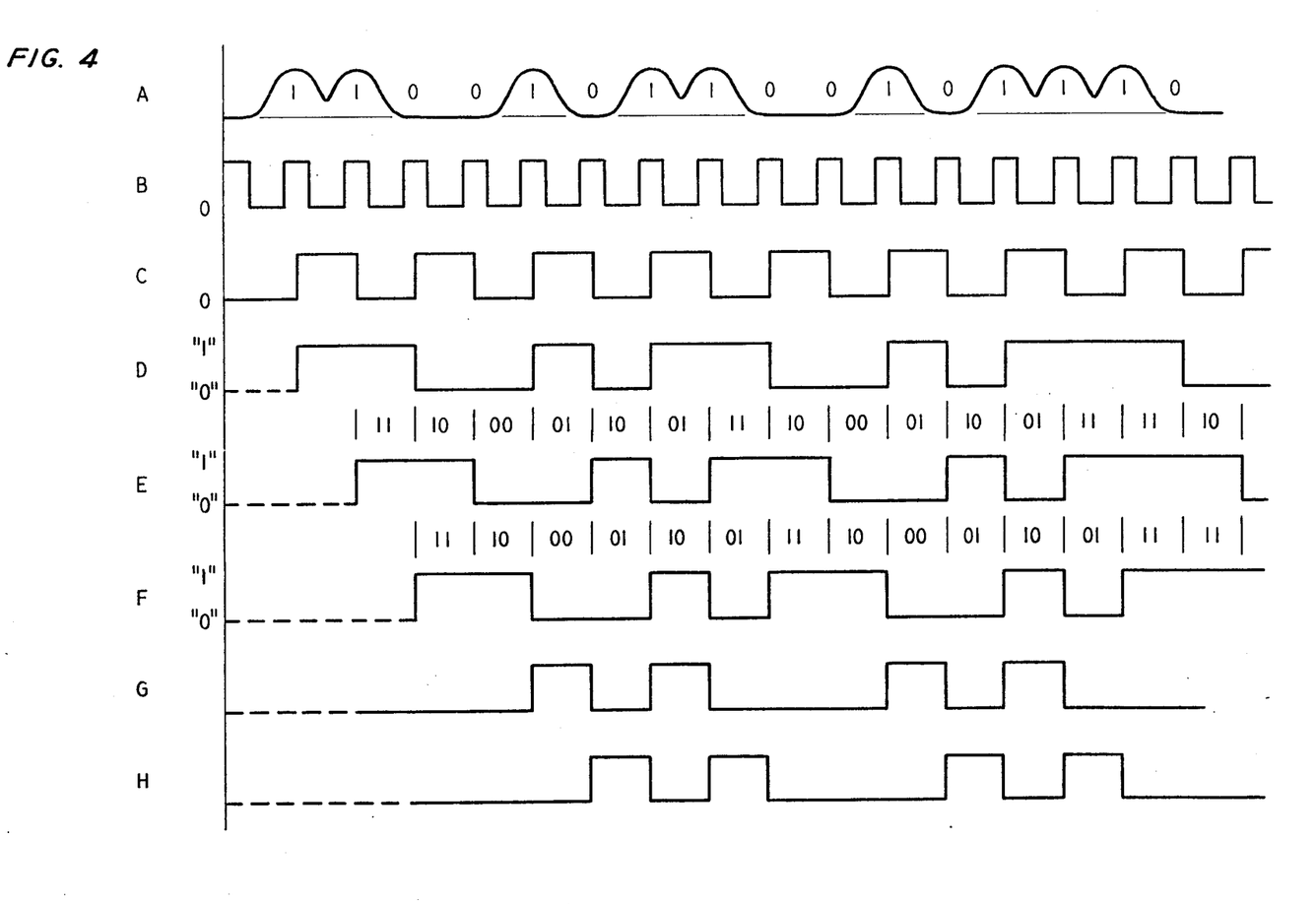

A clock circuit 203 responds to the presence of pulses on line 202 and develops a clocking waveform illustrated as waveform B in FIG. 4. As indicated in waveform B of FIG. 4, the period of the clocking waveform developed by clock circuit 203 on line 204 is equal to the interval between adjacent bits on line 202. This clocking circuit, like the clock circuit of FIG. 1, is of the type well known to those skilled in the art which derive clocking information from digital signals.

The voltage waveform provided by photodetector 201 is also connected by way of line 202 to the D input of a flip-flop 205. The clocking signal on line 204 is connected to the timing or toggle input of flip-flop 205, thereby causing flip-flop 205 to sample the voltage present on line 202 in response to each positive-going transition present in the clock waveform. This type of sampling causes flip-flop 205 to develop a waveform at its Q output of the type shown as waveform D in FIG. 4 in response to the digital states illustrated as waveform A.

The clocking voltage waveform on line 204 is also coupled to the timing inputs of flip-flops 206 and 207. The D input of flip-flop 206 is connected to sample the Q output of flip-flop 205 and the D input of flip-flop 207 is connected to sample the Q output of flip-flop 206. As a result, flip-flop 206 and flip-flop 207 operate in conjunction with flip-flop 205 as a shift register in which adjacent digital bits present on line 202 are stored for three bit intervals. The voltage waveform available at the Q outputs of flip-flops 206 and 207 are identical to the voltage waveform present at the Q output of flip-flop 205 except that these voltage waveforms are delayed by one and two clock intervals, respectively. Hence, for the digital pattern illustrated as waveform A in FIG. 4, flip-flops 206 and 207 generate voltage waveforms of the type illustrated as waveforms E and F, respectively, in FIG. 4.

The clocking waveform of clock circuit 203 is also coupled by way of line 204 to the toggle input of a J/k flip-flop 208. The J and K inputs of flip-flop 208 are connected to a positive potential source. As a result, each positive-going transition present on line 204 causes the J/K flip-flop 208 to change logic states, thereby causing a clocking waveform to be developed at the Q output of flip-flop 208 whose period is equal to twice the period of the clocking waveform developed by clock circuit 203. This clocking waveform of twice the period or one-half the frequency is illustrated as waveform C in FIG. 4.

Voltage waveform C at the Q output of flip-flop 208 is connected to the timing inputs of flip-flops 214 and 215. The Q output of flip-flop 214 is connected to the noninverting input of an analog amplifier 216 and the inverting input of the analog amplifier is connected to the Q output of flip-flop 215. If the D input of flip-flop 214 is presented with a positive voltage equivalent to a logical 1 when the positive-going transition in waveform C is coupled to its timing input, flip-flop 214 causes analog amplifier 216 to develop a positive voltage at its output. If a positive voltage equivalent to a logical 1 is coupled to the D input of flip-flop 215 when the positive-going transition is present in waveform C, flip-flop 215 causes analog amplifier 216 to develop a negative voltage at its output. As will be apparent hereinafter, only one of the flip-flops, 214 or 215, is energized with a positive voltage at its D input during any one positive-going transition in the C waveform.

A logic circuit 210 has one input connected to each of the Q outputs of flip-flops 205 through 207. Logic circuit 210 detects the presence of a logical 1 at two out of three Q outputs of flip-flops 205 through 207. The particular two out of three flip-flops which are used in the detection process by logic circuit 210 is determined by the energization of either its fourth or fifth inputs. If input terminal 4 of logic circuit 210 is energized, then logic circuit 210 provides a logical 0 at its output only if its input terminals 1 and 2 detect the presence of logical 1s at the outputs of flip-flops 205 and 206. This logical 0 output from logic circuit 210 is inverted in a NAND gate 212 and presented as a logical 1 to the D input of flip-flop 214. If, on the other hand, input terminal 5 of logic circuit 210 is energized rather than input terminal 4, logic circuit 210 provides a logical 0 at its output of flip-flops 206 and 207. Hence, logic circuit 210 energizes flip-flop 214 providing two logical 1s are presented by the two out of three flip-flops currently under detection by the logic circuit.

Similarly, logic circuit 211 is connected to the $\bar{Q}$ outputs of flip-flops 205 through 207. By being connected to the $\bar{Q}$ outputs, logic circuit 211 detects the presence of logical 0s in two out of the three flip-flops 205 through 207, the particular two out of three chosen being dependent on whether input terminal 4 or input terminal 5 of logic circuit 211 is energized. When two logical 0s are detected by logic circuit 211 in the flip-flops under detection, logic circuit 211 provides a logical 0 to NAND gate 213 which in turn energizes the D input of flip-flop 215.

Logic circuits 210 and 211 may be easily constructed by those skilled in the art by using the logical function shown in each box of FIG. 2. Briefly, each logic circuit provides a logical 0 at its output only if its input terminals 1, 2 and 4 are energized simultaneously, or if its input terminals 2, 3 and 5 are energized simultaneously. As will be apparent hereinafter, only input terminal 4 or input terminal 5 may be energized at any given time.

The remainder of the apparatus shown in FIG. 2, specifically NAND gates 217 through 220 and flip-flop 221, is utilized to insure that the logic circuits 210 and 211 are connected to read the correct pair of bits present in the shift register consisting of flip-flops 205 through 207. More specifically, this designated apparatus is utilized to detect the presence of the nonpermitted pair of bits and, in response to this detection, causes logic circuits 210 and 211 to transfer their detection from one pair of flip-flops to the other pair of flip-flops.

In the present embodiment, the logical pair of bits, 10, is utilized to represent the digital 0 in the bipolar signal. Under these circumstances, the opposite pair of logical bits, namely, 01 is not permitted to occur in the transmission of any of the voltage levels in the bipolar signal. Accordingly, detection of the logical pair 01 is an indication that there has either been a failure in the transmission facility or a shift in timing between the transmitting and receiving locations.

NAND gate 217 has one input connected to the Q output of flip-flop 205 and a second input connected to the $\bar{Q}$ output of flip-flop 206. Keeping in mind that flip-flop 206 will store a digital bit which has been received earlier in time than the digital bit in flip-flop 205, it should be apparent that NAND gate 217 will be energized to produce a logical 0 at its output when the nonpermitted pair, 01 is stored in flip-flops 205 and 206. Similarly, a NAND gate 218 is connected to the Q output of flip-flop 206 and the $\bar{Q}$ output of flip-flop 207 in order to produce a logical 0 at its output when the nonpermitted pair of bits 01 is stored in flip-flops 206 and 207. The output of NAND gate 217 is coupled through a NAND gate 219 to the K input of a flip-flop 221; the output of NAND gate 218 is coupled through a NAND gate 220 to the J input of flip-flop 221. Both NAND gates 219 and 220 have second inputs connected to a positive potential source. The timing input of flip-flop 221 is coupled, by way of a differentiation network including capacitor 222 and resistor 223, to receive the C timing waveform from flip-flop 208.

The J/K flip-flop 221 operates in a manner well known to those skilled in the art. When a positive-going transition is coupled to its timing input, the Q output of flip-flop 221 will be energized providing the J input is presented with a positive voltage equivalent to a logical 1. On the other hand, the same positive-going transition at the timing input will cause the $\bar{Q}$ output to be energized if a positive voltage equivalent to a logical 1 is presented to the K input of flip-flop 221. Assume, for example, that flip-flops 205 and 206 have the nonpermitted pair of bits 01 in storage, thereby causing NAND gates 217 and 219 to energize the K input of flip-flop 221 during the instant when a positive-going transition is present in the C waveform. If the Q output of flip-flop 221 has been energized up to this time, thereby causing input terminals 4 of both logic circuits 210 and 211 to be energized, flip-flop 221 will immediately be toggled so as to provide a logical 1 at its $\bar{Q}$ output. This in turn will cause input terminals 5 of logic circuits 210 and 211 to be energized, thereby transferring their detection to the bits present in flip-flops 206 and 207. Similarly, the presence of the nonpermitted pair of bits 01 in flip-flops 206 and 207 will cause flip-flop 221 to energize input terminal 4 of both logic circuits 210 and 211, thereby transferring their detection back to the bits present in flip-flops 205 and 206.

In FIG. 4 the digital values present in flip-flops 205 and 206 are presented between waveforms D and E. Similarly, the digital values present in flip-flops 206 and 207 are presented between waveforms E and F. It can be seen from these digital presentations that flip-flops 206 and 207 contain the correct pairs of digital bits following the positive-going transitions in waveform C, whereas flip-flops 205 and 206 will have several instants following the positive-going transitions where a transfer of detection would take place due to the presence of the nonpermitted pair. Waveform G of FIG. 4 is a voltage waveform presentation of the output of NAND gate 219 for the particular digital values illustrated. Similarly, waveform H is a voltage waveform presentation of the output of NAND gate 220 for the particular values illustrated. As indicated in FIG. 4, each of the nonpermitted pairs detected in flip-flops 205 and 206 causes a logical 1 to be present at the output of NAND gate 219 in the intervals immediately following positive-going transitions in waveform C. These positive-going transitions in waveform C would cause a transfer of detection during any one of those instants. After the detection process has settled on flip-flops 206 and 207, however, no transfer would take place for the illustration shown in FIG. 4 inasmuch as logical 1s are only present at the output of NAND gate 220 in the intervals preceding the positive-going transition in waveform C.

It is to be understood that the above description relates to one illustrative embodiment of the present invention. Numerous departures may be made by those skilled in the art without departing from the spirit and scope of the present invention.

We claim:

1. An optical transmission system for use with a bipolar input signal having positive, zero, and negative voltage levels to represent logic states, said transmission system comprising an optical signal source having a control input which can be energized to produce a modulated optical signal, and means responsive to said bipolar signal for developing a binary signal at the control input of said optical signal source having two identical bits of one value to represent said positive level, two identical bits of the opposite value to represent said negative level, and a pair of opposite-valued bits to represent said zero level.

2. An optical transmission system as defined in claim 1 wherein said means for developing a binary signal includes a first and second comparator means each having a first and second input and an output, means for coupling said bipolar input signal to the first input of said first and second comparator means, and means for biasing the second input of said first and second comparator means with different dc potentials.

3. An optical transmission system as defined in claim 2 wherein said means for developing a binary signal further includes a first and second sampling means each having a sampling input, a trigger input and a clearing input, and means for coupling the output of said first comparator means to the sampling input of said first sampling means, and means for coupling the output of said second comparator means to the sampling input of said second sampling means.

4. An optical transmission system as defined in claim 3 wherein said means for developing a binary signal further includes means for providing clocking voltage waveforms to the trigger and clearing inputs of said first and second sampling means, said clocking voltage waveforms having a frequency equal to the bit rate present in said bipolar input signal.

5. An optical transmission system as defined in claim 4 wherein said means for providing a clocking voltage waveform generates two phases of clocking signals and includes means for coupling one of said two phases of clocking signals to the clearing input of said first sampling means and to the trigger input of said second sampling means, and means for coupling the other one of said two phases of clocking signals to the clearing input of said second sampling means and to the trigger input of said first sampling means.

6. An optical transmission system as defined in claim 5 wherein said means for coupling each one of said two phases of clocking signals each includes means for delaying the clocking signal which is applied to the trigger input relative to the same phase of clocking signal that is applied to the clearing input.

7. An optical transmission system for use with a bipolar electrical signal in which digital 1s are represented by pulses alternating in polarity and digital 0s are represented by spaces, said transmission system comprising an optical signal source having a control input which can be energized to produce a modulated optical signal, means for developing two clock signals in response to said bipolar electrical signal thereby dividing bit intervals in said bipolar signal into two substantially equal parts represented by transitions in the two developed clock signals, first means for developing a pulse at the control input of said optical signal source in response to a digital 1 of one polarity in said bipolar signal following a transition in one of said two developed clock signals, and second means for developing a pulse at the control input of said optical signal source in response to a digital 1 of said one polarity or a digital 0 in said bipolar input signal following a transition in the other one of said two clock signals.

8. An optical transmission system as defined in claim 7 wherein said first and second means for developing a pulse at the control input of said optical signal source each includes a comparator circuit having one input connected to receive said bipolar electrical signal and a second input connected to receive a predetermined dc potential.

9. An optical transmission system as defined in claim 8 wherein said first and second means for developing a pulse at the control input of said optical signal source each includes a flip-flop circuit having a sampling input connected to receive an output from its respective comparator circuit, a trigger input connected to receive one of said two developed clock signals, and a clearing input connected to receive the other one of said two developed clock signals.

10. An optical transmission system as defined in claim 9 wherein said means for developing two clock signals includes a toggling flip-flop means having one of its outputs connected to the clearing input of the flip-flop circuit in said first means for developing a pulse and a second output connected to the clearing input of the flip-flop circuit in said second means for developing a pulse.

11. An optical transmission system as defined in claim 10 wherein said means for developing two clock signals further includes a first delay means connected between one output of said toggling flip-flop means and the trigger input of the flip-flop means and the trigger input of the flip-flop circuit in said first means for developing a pulse, and a second delay means connected between the other output of said toggling flip-flop means and the trigger input of the flip-flop circuit in said second means for developing a pulse.

* * * * *

UNITED STATES PATENT AND TRADEMARK OFFICE
CERTIFICATE OF CORRECTION

PATENT NO. : 4,001,578
DATED : January 4, 1977
INVENTOR(S) : John S. Cook and Stewart D. Personick It is certified that error appears in the above-identified patent and that said Letters Patent are hereby corrected as shown below:

Column 10, line 50, "the trigger input of the flip-flop means and" should be deleted.

*Signed and Sealed this*

*Twenty-fifth* Day of *March 1980*

[SEAL]

Attest:

SIDNEY A. DIAMOND

*Attesting Officer*     *Commissioner of Patents and Trademarks*